US009454570B2

(12) United States Patent
Clevenger

(10) Patent No.: US 9,454,570 B2
(45) Date of Patent: Sep. 27, 2016

(54) DYNAMIC DATABASE INDEXING

(71) Applicant: THOMSON LICENSING, Issy de Moulineaux (FR)

(72) Inventor: Brian Duane Clevenger, Muncie, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 188 days.

(21) Appl. No.: 14/345,986

(22) PCT Filed: Sep. 20, 2012

(86) PCT No.: PCT/US2012/056200
§ 371 (c)(1),
(2) Date: Mar. 20, 2014

(87) PCT Pub. No.: WO2013/048844
PCT Pub. Date: Apr. 4, 2013

(65) Prior Publication Data
US 2015/0178351 A1 Jun. 25, 2015

Related U.S. Application Data

(60) Provisional application No. 61/539,691, filed on Sep. 27, 2011.

(51) Int. Cl.
*G06F 17/00* (2006.01)
*G06F 17/30* (2006.01)

(52) U.S. Cl.
CPC ... *G06F 17/30442* (2013.01); *G06F 17/30292* (2013.01); *G06F 17/30312* (2013.01); *G06F 17/30336* (2013.01)

(58) Field of Classification Search
CPC .................. G06F 17/30; G06F 17/30442
USPC ................................. 707/600–899
See application file for complete search history.

(56) References Cited

U.S. PATENT DOCUMENTS 8,578,487 B2 * 11/2013 Soeder .............. G06F 21/554
726/1
2008/0183764 A1 7/2008 Bruno et al.

OTHER PUBLICATIONS

Luhring et al., "Autonomous Management of Soft Indexes", 2007 IEEE 23rd International Conference on Data Engineering Workshop, Apr. 1, 2007, pp. 450-458.
Schnaitter et al., "On-Line Index Selection for Shifting Workloads", 2007 IEEE 23rd International Conference on Data Engineering Workshop, Apr. 1, 2007, pp. 459-468.
Valentin et al., "DB2 Advisor: An Optimizer Smart Enough to Recommend its Own Indexes". 16th International Conference on Data Engineering, San Diego, CA, Feb. 29-Mar. 3, 2000, IEEE Comput. Soc., Los Alamitos, CA, pp. 101-110.

* cited by examiner

*Primary Examiner* — Isaac M Woo
(74) *Attorney, Agent, or Firm* — Brian J. Dorini; Robert D. Shedd

(57) ABSTRACT

A database query is intercepted by a query analyzer before it reaches a database. The query analyzer then tracks where the query accesses the database and how long the operation takes to complete. A statistical model is then constructed during runtime based on this tracking information to create an updated index schema for the database. The database index structure is then updated with the new schema to reduce query access times.

3 Claims, 2 Drawing Sheets

DYNAMIC DATABASE INDEXING

CROSS-REFERENCE TO RELATED APPLICATION

This application claims the benefit, under 35 U.S.C. §365 of International Application PCT/US2012/056200, filed 20 Sep. 2012, which accordance with PCT Article 21(2) on 124 Apr. 2013, in English and which claims the benefit of U.S. Provisional Application Ser. No. 61/539,6918 filed 27 Sep. 2011.

BACKGROUND

Database engines typically provide search functionality that allow a subset of data to be returned based on user defined search criteria. For unordered data without indexing, search operations often require all records in the database to be analyzed against the search criteria before the complete result set can be returned. Database sizes can be substantial. Analyzing all records in a database against specified search criteria can take hours or even days to complete. The time required to complete a search can be reduced by using indexes, but indexes increase the storage space required for the database and the time required to add or modify database entries. If the most common search operations are known in advance, a database can be designed to only index data required to optimize common search operations. However, for databases where common search operations are not known in advance or may change over time, a need exists to dynamically adapt the set of indexes during operation to optimize database performance and storage requirements.

SUMMARY

Queries made on a database at runtime are analyzed based on a statistical analysis of the types of queries that are frequently made. The database schema can be automatically altered at runtime to build indexes that improve search times for frequently executed queries.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter can be employed, and the subject matter is intended to include all such aspects and their equivalents. Other advantages and novel features of the subject matter can become apparent from the following detailed description when considered in conjunction with the drawings.

DETAILED DESCRIPTION

Figure 1:
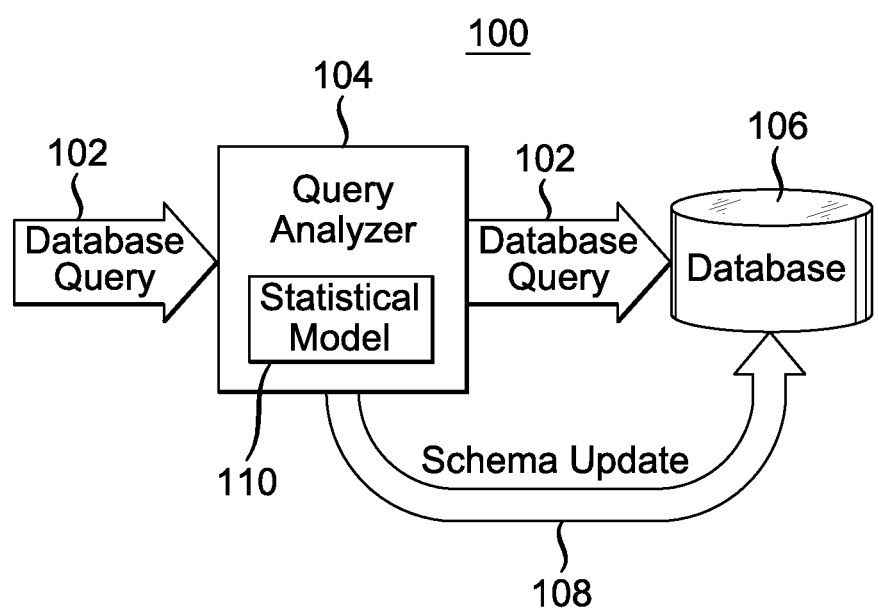
FIG. 1 is an example of a database query analyzer system using an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details. In other instances, well-known structures and devices are shown in block diagram form in order to facilitate describing the embodiments.

Search performance on a database is highly dependent on the indexes that are defined in the database schema. In one example that uses B-trees for indexing, Big O notation is used to denote the complexity of an operation. Using an index can reduce an O(N) operation to an O(log(N)) operation. In another example using a hash based index, using indexing can reduce the operation to an amortized constant time instead of a logarithmic time. However, indexes increase the size of the database and they increase the time it takes to insert data into a database, so it's not practical to index everything. Ordinarily, indexes are chosen by the developer based on what the developer knows about the potential size of particular tables and the types of queries a developer expects to execute on a database. However, it is not possible for a developer to define appropriate indexes if the developer doesn't know how large tables will grow and the types of queries that will be executed. The present invention solves this problem by analyzing database operations at runtime and dynamically adapting the database schema.

The following examples utilize SQL database terminology examples. However, those skilled in the art will appreciate that the methodologies and systems disclosed herein can be applied to other database systems as well.

With reference to one example of a query process 100 for a database 106 in FIG. 1, a database query 102 is intercepted before it reaches the database 106 by a query analyzer 104, and, in one instance, a search expression (i.e., a WHERE clause of a SQL database) of the query is analyzed, and the following, on a per-query basis, are tracked:

1. The table and columns in the search expression (i.e., WHERE clause in SQL) that use an operator that could benefit from indexing (this includes comparison operators such as =, <, >, etc. but could exclude operators that won't benefit from indexing such as operators for complex string pattern matching (i.e., "LIKE" or "GLOB" in SQL)).
2. The time it takes for the query to execute.

The query analyzer 104 can be a processor configured for executing at least the specific task of analyzing database queries during runtime before the queries reach a database.

Over time the tracking information can be used to develop a statistical model 110 in the query analyzer 104 or the like that predicts, for example, the table columns that most benefit from indexing by considering, for example, how frequently a column appears in the search expression of a query, the average execution time of those queries, the number of rows in the associated table, and/or how frequently insert, update, and/or delete operations that affect the column occur on the table. Based on the statistical model 110 a schema update 108 can be determined and indexes can then be periodically removed and/or added to the database schema at runtime to reduce an average query execution time based on database usage patterns. The statistical model 110 can reside on the same processor as the query analyzer 104 and/or can reside on a different processor configured at least for the specific task of creating a statistical model based on the tracking information provided by the query analyzer 104.

Figure 2:
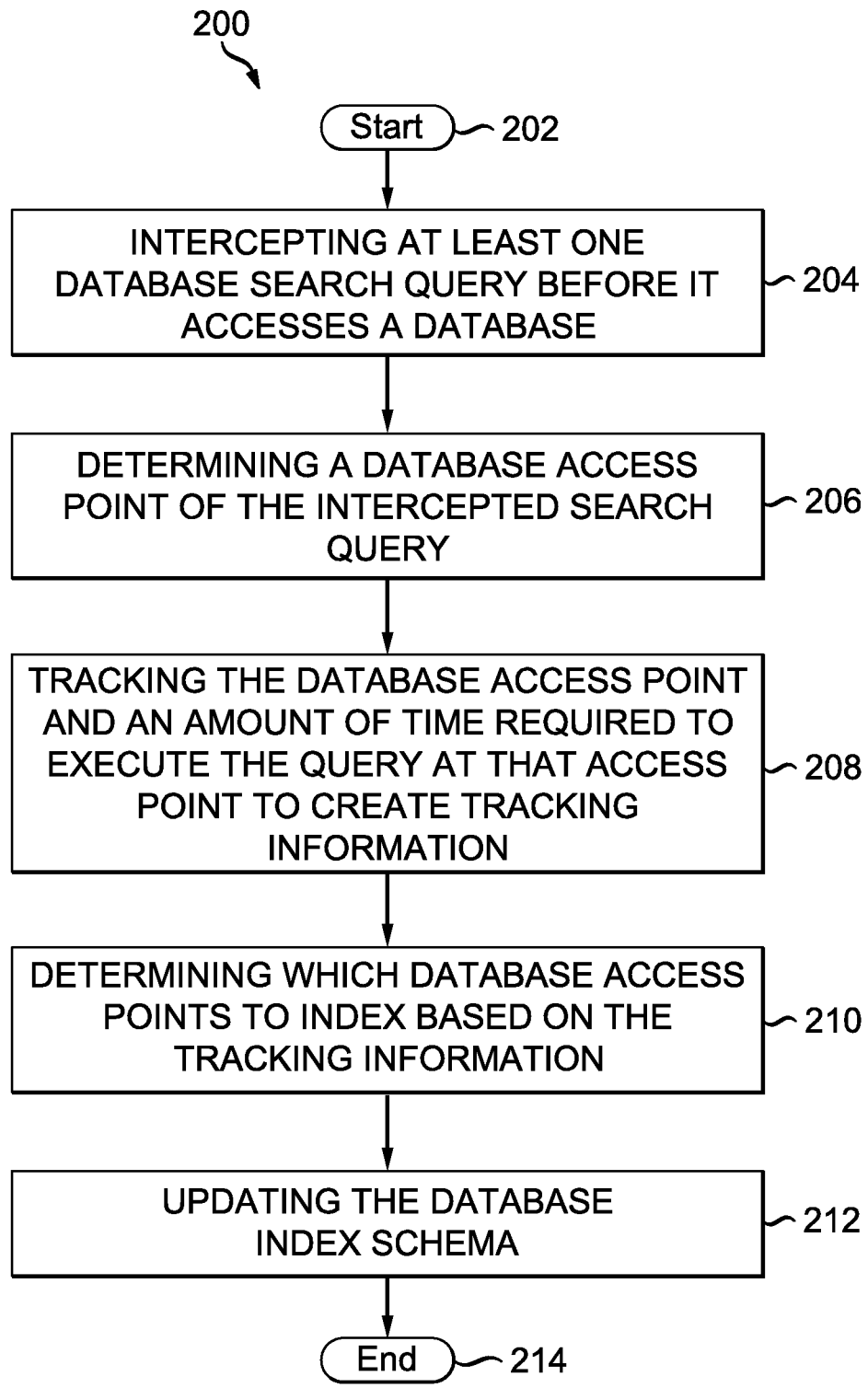
FIG. 2 is a flow diagram of a method 200 of analyzing database queries.

FIG. 2 illustrates a method 200 of analyzing database queries. The method 200 starts 202 by intercepting at least one database search query before it accesses a database 204. The intercepted query is analyzed to determine its database access point 206. Typically, this involves analyzing the query's search expression to determine what tables and columns it is accessing in the database. The database access points and an amount of time required to execute the query is tracked to create tracking information 208. The tracking information can also include frequency information and other relevant information described above. The tracking information is then used to determine which database access points to index 210. This can be accomplished by creating a statistical model to show which areas of the database are accessed the most and would benefit the most by being indexed. This information is then used to update the database schema or indexing during runtime to create a more efficient query operation for the database 212, ending the flow 214.

What has been described above includes examples of the embodiments. It is, of course, not possible to describe every conceivable combination of components or methodologies for purposes of describing the embodiments, but one of ordinary skill in the art can recognize that many further combinations and permutations of the embodiments are possible. Accordingly, the subject matter is intended to embrace all such alterations, modifications and variations that fall within scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for searching a database, comprising:
    analyzing database operations at runtime; and
    dynamically adapting the database based on the runtime operations analysis, wherein the analyzing comprises
        intercepting at least one database search query before accessing the database; and
        determining a database access point of the intercepted search query; and
        tracking the database access point and an amount of time required to execute the query at that access point to create tracking information;
and wherein
    the search query comprises a search expression for the query; and
    the search expression comprises at least one of a table and a column; and
the tracking information comprises at least one of a frequency of a column in a search expression, an average execution time of a query, a number of rows in a table, a frequency of an insert operation affecting a column, a frequency of an update operation affecting a column and a frequency of a delete operation affecting a column.

2. The method of claim 1 further comprising:
    deleting or adding at least one index of the database at runtime to reduce an average query execution time based on database usage patterns.

3. The method of claim 1 further comprising:
    determining which database access points to index based on the tracking information.

* * * * *